Sept. 5, 1961        H. H. GEORGE        2,999,238
AUTOMATIC ERROR SENSITIVITY CONTROL FOR RADAR RECEIVER
Filed Oct. 28, 1954        2 Sheets-Sheet 1
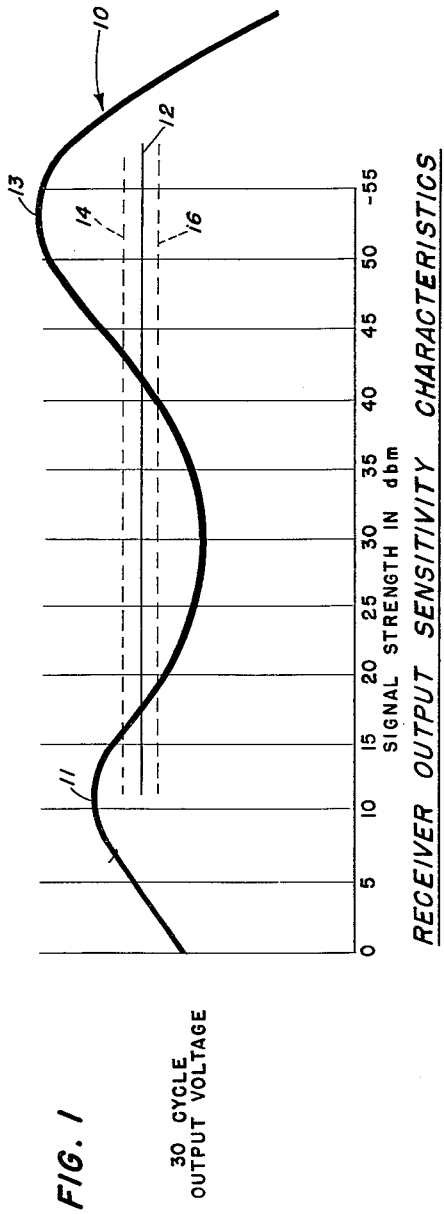
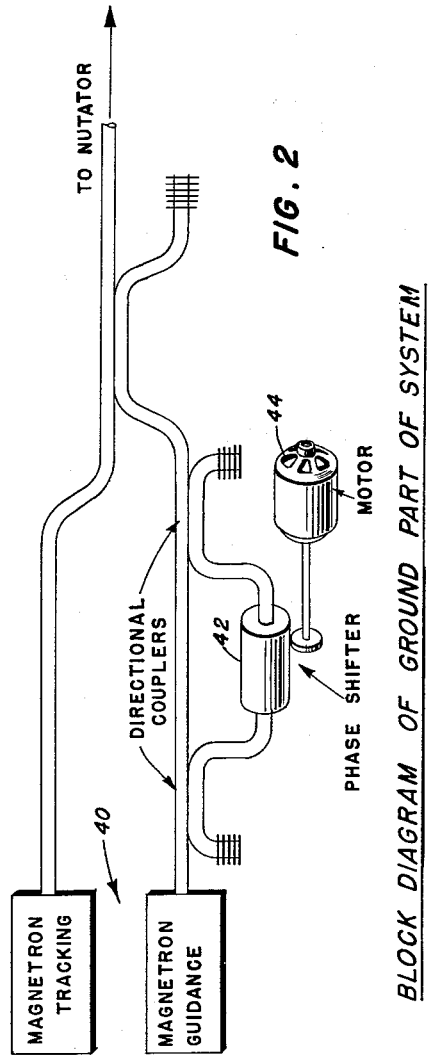
INVENTOR.
HENRY H. GEORGE
BY
*ATTORNEYS*

Sept. 5, 1961        H. H. GEORGE        2,999,238
AUTOMATIC ERROR SENSITIVITY CONTROL FOR RADAR RECEIVER
Filed Oct. 28, 1954        2 Sheets-Sheet 2
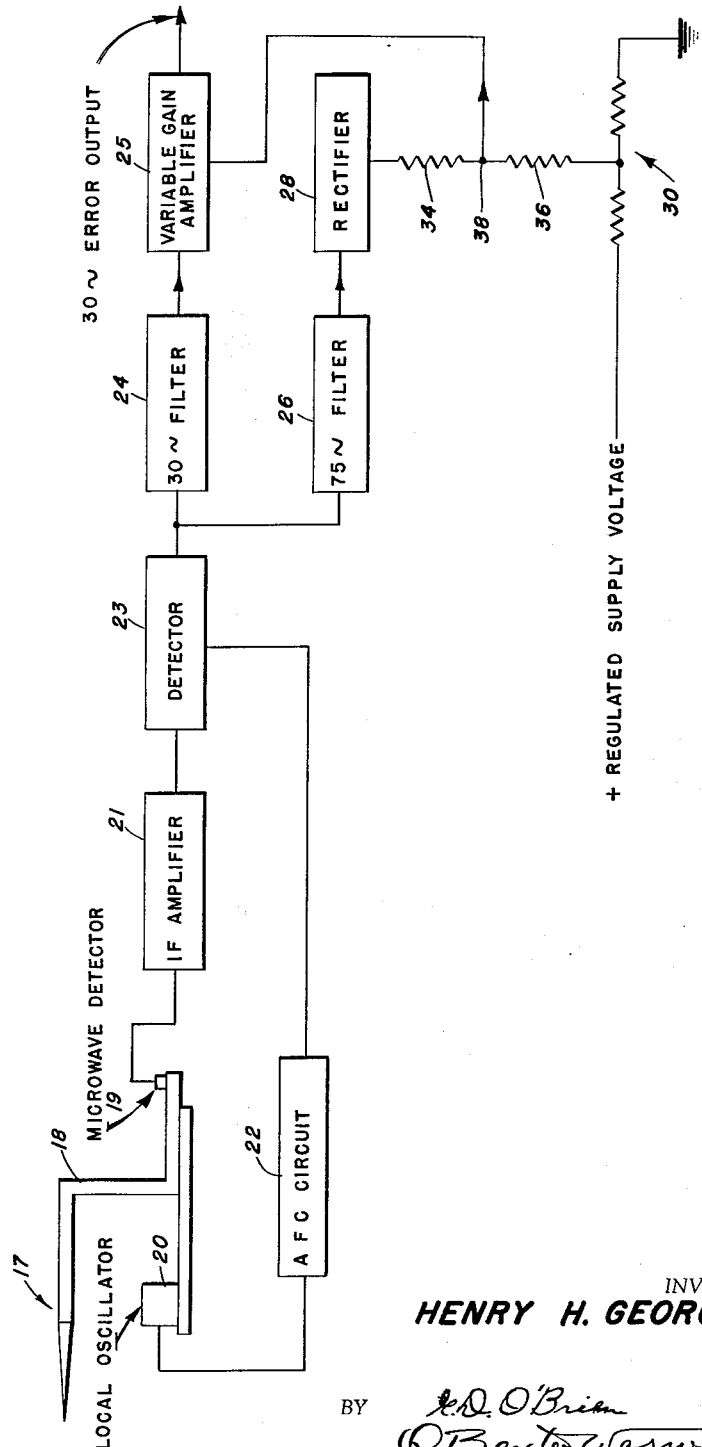
INVENTOR
HENRY H. GEORGE

United States Patent Office 2,999,238
Patented Sept. 5, 1961

2,999,238
AUTOMATIC ERROR SENSITIVITY CONTROL FOR RADAR RECEIVER
Henry H. George, Silver Spring, Md., assignor to the United States of America as represented by the Secretary of the Navy
Filed Oct. 28, 1954, Ser. No. 465,455
3 Claims. (Cl. 343—108)

This invention relates to receiving apparatus for guided missiles, and more particularly it pertains to means for self-calibrating and adjusting the error sensitivity of the missile receiver to insure optimum system performance.

One of the requirements of a beam rider missile receiver, for example, of the type described in U.S. patent application Serial No. 162,902 for "Method and Apparatus for Controlling an Airborne Vehicle," filed May 19, 1950 by William C. Parkinson et al., is that the error signal output therefrom have a specified output sensitivity, i.e., a specified value of control voltage output per unit angular error from the axis of the guidance or capture beam used for guiding the missile. This value must not vary more than several percent for variations of input signal strength under all required environmental conditions.

Assuming the characteristics of the radar beam are within specification tolerances, it is still necessary for the receiver of the missile to maintain a fixed relationship between the beam modulation which it "sees" and the control voltage which it "delivers." To achieve this objective, it has been found necessary in the past to use precision circuitry with hand-tailored components.

In addition to this, components may suffer changes in their characteristics as a function of time, particularly in the case of vacuum tubes, so that a certain percentage of receivers will be outside the desired limits of output sensitivity for actual flight performance of the missile.

Therefore, it is one of the objects of this invention to provide a method and means for self-calibrating and adjusting the error sensitivity of the missile receiver in order to insure optimum system performance in this respect and greatly decrease the time consumed in factory hand-tailoring operations.

Even still another object of this invention is to provide a means for adjusting the error sensitivity of the missile receiver at the ground radar, either prior to or during flight of an aerial missile.

Another object of the invention is to provide an electronic arrangement which will permit the use of fewer precision components within the missile receiver.

These and other objects and many of the attendant advantages of this invention will be readily appreciated as the same becomes better understood by reference to the following detailed description when considered in connection with the accompanying drawings wherein:

FIG. 1 is a graphical representation of the output sensitivity characteristics of a missile receiver illustrating output D.C. voltage plotted as a function of signal strength in dbm;

FIG. 2 is a schematic, partly in perspective, of one possible arrangement for injecting the necessary fixed modulation into the ground portion of the radar system; and FIG. 3 is a schematic of a missile receiver system including the circuit for automatic gain stabilization of the system.

In accordance with the present invention, apparatus is provided for inserting on a microwave signal a known level of amplitude modulation at a frequency of 75 c.p.s., sufficiently different from the error signal frequency (radar nutation frequency) to permit separation of modulations within the missile receiver, yet close enough to have identical response or gain characteristics in the receiver. The calibrating amplitude modulation signal is separated from the error signal and subsequently detected for comparison with a standard D.C. voltage signal to obtain a difference voltage which is utilized to control or correct the error channel gain of the missile receiver. Thus, a known level of 75 cycle modulation is used to tell the missile receiver whether its error gain is high, low, or normal, and to provide a means to "normalize" the error channel gain.

Referring now to FIG. 1, there is shown a sway-back curve 10 which is a typical D.C. error voltage output (for constant beam error) as a function of range for a missile receiver. The peaks 11 and 13 in this curve 10 may be due to non-linear characteristics of first and second detectors, to the AGC circuitry 22 shown in FIG. 3, and to the deviation from a logarithmic transconductance-grid bias relationship of the remote cut-off tubes in the missile receiver IF strip. The "flat" curve 12 represents the desired performance of the missile receiver, with the dotted lines 14 and 16 being specified limits of tolerance thereof.

Referring now to FIG. 3, there is illustrated a missile receiver system which includes an antenna 17 for receiving a signal from a guidance beam of electromagnetic energy. This antenna 17 is connected through a waveguide 18 to a microwave crystal detector 19 and a local oscillator 20. The microwave detector 19 is connected to an IF amplifier 21, and the latter, in turn, to an amplitude detector or pulse demodulator 23. A conventional AFC circuit 22 is provided between the local oscillator 20 and the detector 23 for maintaining the local oscillator frequency displaced from a signal frequency by the amount of the IF frequency. The AFC circuit 22 may conveniently comprise the type described in U.S. Patent No. 2,695,358 to G. B. Bush.

The output from the detector 23 contains the error signal and the calibrating signal voltages. The error frequency is separated by a 30 cycle filter 24 to feed a variable gain amplifier 25.

Also from the output of the detector 23, a 75 cycle filter 26 separates the calibrating signal voltage and this voltage is rectified by a rectifier 28 and compared with a standard voltage shown here as being derived from a regulated power supply 30. The difference of the rectified calibrating voltage and the standard voltage is obtained by a simple resistance network, including resistors 34 and 36. The difference voltage then is used to adjust the gain of the variable gain amplifier 25.

The output signal from the variable gain amplifier 25 is the desired guidance control signal for guiding the missile along the guidance beam.

Thus the 30 cycle and 75 cycle filters 24 and 26 separate the variable beam error signal and the calibrating signal. The 75 cycle calibrating signal is rectified by rectifier 28 to give a negative D.C. output voltage, and this voltage is then compared with the standard positive voltage from the regulated power supply 30.

For an example, if the correct rectified voltage should be minus 10 volts and the standard voltage is plus 10 volts, then the difference at point 38 is zero and no correcting voltage is applied to the variable gain amplifier 25. If the receiver error gain is above normal, the rectified voltage is also above normal (say minus 14 volts) and the voltage at point 38 is minus 2 volts. This negative voltage then decreases the gain of the amplifier 25 to provide more nearly the required amplitude 30 cycle signal.

The variable gain amplifier 25 may be a variable-mu tube amplifier or a variable attenuator such as the Bell System Compandor (volume compressor-amplifier) which is a balanced T-pad attenuator with triodes operated near cutoff as the legs of the attenuator. The correcting voltages (push pull, in this case) would be fed to the biased triode grids.

In FIG. 2, there is illustrated a block diagram an arrangement for injecting the necessary fixed modulation into the transmitted signal. The arrangement here assumes that the fixed modulation is injected into the guidance signals at the ground radar. Ground-injection appears to have the following advantages:

(1) Precision equipment can be used, and can be checked to ensure that the amount of modulation remains constant;

(2) Changes in the injected modulation could be made if desired, as for example to compensate for deviations of the radar beam shape from its specifications;

(3) The modulation is inserted at a fixed power level; and (4) Further complication of missile circuitry is avoided.

In FIG. 2, the microwave power from a magnetron 40 is amplitude modulated precisely at one decibel peak-to-valley at a rate of 75 cycles per second by a phase-shifter 42 actuated by a motor 44.

The frequency of 75 cycles per second is used here for two reasons, first, because it does not interfere with the 30 c.p.s. error signal or its harmonics, and second, because this frequency can be generated with known mechanical devices.

Obviously many modifications and variations of the present invention are possible in the light of the above teachings. It is therefore to be understood that within the scope of the appended claims the invention may be practiced otherwise than as specifically described.

What is claimed is:

1. In a receiver for a beam riding missile, said receiver providing an error signal output proportional to the displacement of the missile from the axis of a nutating guidance beam; a sensitivity control comprising means for inserting on the missile guidance beam a calibrating signal at a known level of amplitude modulation and at a frequency sufficiently different from the nutation frequency of the guidance beam to permit separation of the calibrating frequency from the nutation frequency, means for detecting the receiver output, means for separating said calibrating signal from said detected receiver output, means for rectifying said separated calibrating signal to obtain the average value thereof, a reference voltage source having a constant value output, and means for comparing the output of said reference voltage source with the average value of said calibrating signal for controlling the gain of said receiver to maintain said average value at a constant level.

2. In a receiver for a beam riding missile, said receiver providing an error signal output proportional to the displacement of the missile from the axis of a nutating guidance beam; a sensitivity control comprising means for inserting on the missile guidance beam a calibrating signal at a known level of amplitude modulation and at a frequencey sufficiently different from the nutation frequency of the guidance beam to permit separation of the calibrating frequency from the nutation frequency, means for detecting the receiver output, a filter tuned to the frequency of said calibrating signal for separating said calibrating signal from said detected receiver output, a rectifier for obtaining the average value of said calibrating signal, means for comparing the average value of said calibrating signal with a standard D.C. voltage signal to obtain a difference voltage, and means for utilizing said difference voltage to control the gain of said receiver to maintain the average value of said calibrating signal at a constant level.

3. In combination a beam riding missile system including a ground radar for projecting a nutating guidance beam of electromagnetic energy and a receiver for providing an error signal proportional to the displacement of the missile from the axis of said nutating guidance beam; apparatus for self-calibrating and adjusting the error sensitivity of said receiver, comprising, means including a phase shifter for modulating the amplitude of the guidance beam transmitted by said ground radar at a known level and at a frequency sufficiently different from the nutation frequency of the guidance beam to permit separation of the calibrating frequency from the nutation frequency, means for detecting the receiver output, a filter tuned to the frequency of said calibrating signal for separating said calibrating signal from said detected receiver output, a rectifier for obtaining the average value of said calibrating signal, means for comparing the average value of said calibrating signal with a standard D.C. voltage signal to obtain a difference voltage, and means for utilizing said difference voltage to control the gain of said receiver.

References Cited in the file of this patent

UNITED STATES PATENTS

| | | |
|---|---|---|
| 2,065,826 | Roosenstein et al. | Dec. 29, 1936 |
| 2,244,066 | Jarvis | June 3, 1941 |
| 2,368,693 | Watts | Feb. 6, 1945 |
| 2,477,028 | Wilkie | July 26, 1949 |
| 2,519,359 | Dean | Aug. 22, 1950 |
| 2,624,041 | Evans | Dec. 30, 1952 |
| 2,885,669 | Lenz | May 5, 1959 |

FOREIGN PATENTS

| | | |
|---|---|---|
| 528,061 | Great Britain | Oct. 22, 1940 |